United States Patent
Berghoff et al.

(10) Patent No.: US 9,307,703 B2
(45) Date of Patent: Apr. 12, 2016

(54) DEVICE AND METHOD FOR GROWTH ACCELERATION AND REGENERATION OF LAWN AREAS

(75) Inventors: Rudolf Erwin Berghoff, Unterschleissheim (DE); Peter Krabbendam, Haarlem (NL)

(73) Assignee: LINDE AG, Munich (DE)

( * ) Notice: Subject to any disclaimer, the term of this patent is extended or adjusted under 35 U.S.C. 154(b) by 311 days.

(21) Appl. No.: 12/937,075

(22) PCT Filed: Dec. 17, 2008

(86) PCT No.: PCT/EP2008/010780
§ 371 (c)(1),
(2), (4) Date: Dec. 21, 2010

(87) PCT Pub. No.: WO2009/124577
PCT Pub. Date: Oct. 15, 2009

(65) Prior Publication Data
US 2011/0099895 A1    May 5, 2011

(30) Foreign Application Priority Data
Apr. 11, 2008  (DE) .......................... 10 2008 018 459

(51) Int. Cl.
*A01G 9/00*    (2006.01)
*A01G 9/16*    (2006.01)
*A01G 7/04*    (2006.01)

(52) U.S. Cl.
CPC .. *A01G 9/16* (2013.01); *A01G 7/04* (2013.01); *A01G 7/045* (2013.01)

(58) Field of Classification Search
CPC ........... A01G 1/002; A01G 9/16; A01G 9/18; A01G 7/04; A01G 7/02; A01G 9/00; A01G 9/14; A01G 9/1438; A01G 9/24; A01G 9/242; A01G 7/045; A01G 13/0231; A01G 13/0243; A01G 13/025; A01G 13/0206; A01G 13/04; A01G 13/043; A01G 13/046; A01G 13/06; A01G 13/065; A01G 13/008; A01G 15/00; A01G 25/097; A01B 45/00; A01B 45/02; A01B 45/04
USPC ................ 47/17, 19.1, 29.1–29.7, 22.1, 32.2, 47/19.2, 20.1; 111/901, 902
IPC .................................. A01B 45/00, 45/02, 45/04
See application file for complete search history.

(56) References Cited

U.S. PATENT DOCUMENTS

| 4,163,342 A | * | 8/1979 | Fogg et al. ................. 47/58.1 R |
| 4,569,150 A | * | 2/1986 | Carlson et al. ................. 47/17 |

(Continued)

FOREIGN PATENT DOCUMENTS

| DE | 102004019049 A1 * | 11/2005 |
| EP | 0561193 A | 9/1993 |

(Continued)

*Primary Examiner* — Joshua Huson
(74) *Attorney, Agent, or Firm* — Porzio, Bromberg & Newman, P.C.

(57) ABSTRACT

The device according to the invention is designed for growth acceleration and regeneration of lawn areas (2). It comprises a housing (3) which is open towards the bottom and can be placed on a lawn area (2) and delimits a space (6) above the lawn area (2), the housing (3) being formed so as to be transparent and/or comprising an illumination device (32) for illuminating the lawn area (2). The housing (3) is realized with a moving equipment (17) for automatically moving the housing (3) over the lawn area (2).

25 Claims, 9 Drawing Sheets

(56) References Cited

U.S. PATENT DOCUMENTS

| | | | |
|---|---|---|---|
| 4,903,464 A * | 2/1990 | Debruhl, Jr. | 56/10.1 |
| 5,713,154 A * | 2/1998 | Goldstein et al. | 47/17 |
| 6,079,152 A * | 6/2000 | Hou | 47/17 |
| 6,141,902 A * | 11/2000 | Boice | 47/17 |
| 6,260,308 B1 * | 7/2001 | Looney | 52/63 |
| 7,911,616 B2 * | 3/2011 | Franzen et al. | 356/445 |
| 2001/0035468 A1 * | 11/2001 | Santa Cruz | A01G 7/045 239/726 |
| 2006/0091234 A1 * | 5/2006 | Wallander | A01G 9/24 |
| 2006/0254160 A1 * | 11/2006 | Lee | 239/146 52/67 |
| 2009/0193715 A1 * | 8/2009 | Wilcox | 47/59 R |

FOREIGN PATENT DOCUMENTS

| | | | |
|---|---|---|---|
| EP | 1844647 A | 10/2007 | |
| FR | 2555219 A | 5/1985 | |
| GB | 2350997 A * | 12/2000 | A01G 9/20 |
| WO | 9509681 A | 4/1995 | |
| WO | 2008115065 A | 9/2008 | |

* cited by examiner

DEVICE AND METHOD FOR GROWTH ACCELERATION AND REGENERATION OF LAWN AREAS

CROSS REFERENCE TO RELATED APPLICATION

This is a National Stage of International Application No. PCT/EP2008/010780, filed 17 Dec. 2008, which claims the benefit of Application No. 10 2008 018 459.4, filed in Germany on 11 Apr. 2008, the disclosures of which Applications are incorporated by reference herein.

The invention relates to a device and a method for growth acceleration and regeneration of lawn areas.

EP 0 561 193 A2 discloses a method and a device for stimulating the growth of plants and grass. The device comprises a covering which covers the grass almost completely, light sources and two fans for introducing carbon dioxide. Within 24 hours, the grass underneath this closed covering is illuminated by means of the artificial light sources for approximately 8 to 12 hours. The atmosphere to which the grass is exposed is stirred continuously or in intervals by the two fans and/or is exchanged continuously or from time to time. The amount of carbon dioxide absorbed by the grass is supposed to be supplied continuously or in time intervals to the atmosphere of the space by a means for introducing carbon dioxide. This method and this device are supposed to allow the growth of grass at each time of the year corresponding to the natural pre-conditions.

EP 1 269 815 A describes a device for treating lawn areas with gas. In this arrangement, the lawn area is supplied with a gas flow through a gas duct extending across a lawn area. The gas duct has its one open end connected to a pressure unit and is closed at the other end. It has outlet openings at a region facing the lawn area. In a further development of the device, sensors are provided which detect one or more measured values such as ambient temperature, ambient air moisture, lawn temperature, lawn humidity, gas inlet temperature, gas outlet temperature, inlet gas humidity, outlet gas humidity, the amount of carbon dioxide as well as the fertilizer amount, and transmit these to a regulating and control device by means of which the pressure unit and/or the supply of water vapor and/or carbon dioxide and/or fertilizer and/or a heating unit can be adjusted. The device can also be realized as a mobile device including an undercarriage. With such a mobile device, the undercarriage is provided so as to include a drive. The drive is realized by means of a driving chain extending in a driving channel. The driving channel is below the level of the lawn area.

DE 10 2006 017 813 A1 discloses a method of growth acceleration and regeneration of lawn areas, the upper side of the lawn area being enclosed at least in sections by a space which is opened towards the bottom and is enclosed on all sides. $CO_2$ is introduced into that space, and the lawn area covered by the space is exposed with light by means of an illumination device. Reference is made to the content of DE 10 2006 017 813 A1 in its entirety.

It is a disadvantage of the device known from prior art that only a limited area is covered and an enlargement of the device is overly expensive. Moreover, growth devices of this type are very vulnerable to thunderstorms because of their height and their light-weight construction.

It is the object of the invention to provide a device and a method which allow accelerating the growth of large lawn areas in a simple and cost-effective manner.

Advantageous further developments are characterized in the dependent sub-claims.

The device according to the invention is designed for growth acceleration and regeneration of lawn areas. It comprises a housing that is open at the bottom and can be placed on a lawn area and delimits a space above the lawn area, the housing being realized so as to be transparent and/or comprising an illumination device for illuminating the lawn area. The housing is realized with a moving equipment for automatically moving the housing over the lawn area.

Due to the fact that the device according to the invention is automatically moved, fewer manual operations are required during the use of such a device. In this way, the cost for personal is reduced and the device is able to treat an entire lawn area in an independent manner.

In addition, the automatic moving process results in the lawn areas being treated exactly according to pre-adjusted parameters, whereby a more effective and more uniform treatment of the lawn area is performed.

Any damage to the device by thunderstorms is avoided by collapsing it or moving it away. The risk of damage to persons by flying or falling devices is reduced, too.

The invention will now be exemplarily explained on the basis of a drawing.

The devices 1 according to the invention are provided to accelerate the growth of a lawn 2, they comprising a movable housing 3 which is opened towards the bottom and serves for covering a region of the lawn 2.

Figure 1:
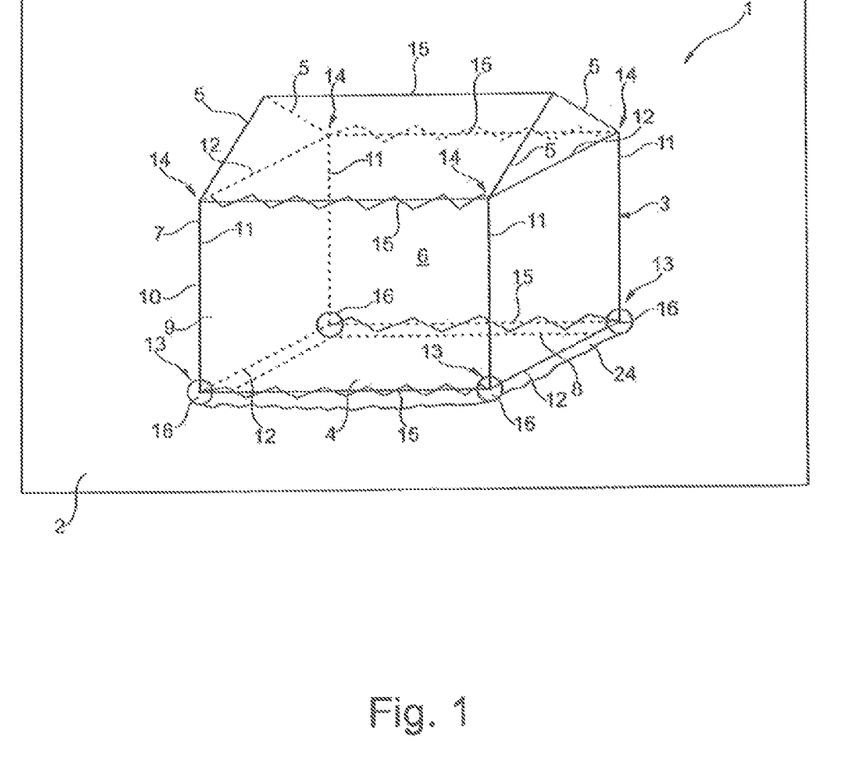
FIG. 1 shows a device according to the invention and the housing thereof in a three-dimensional view without any components.
Figure 2:
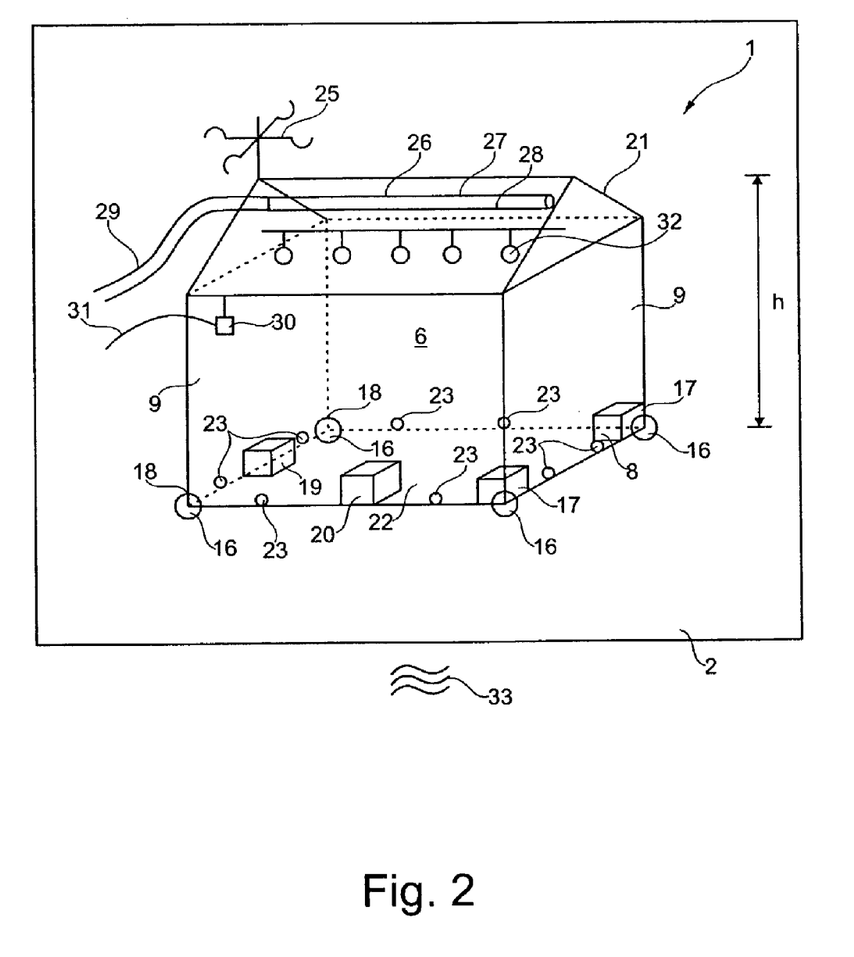
FIG. 2 shows the device according to the invention of FIG. 1 including components.

FIG. 1 illustrates a first exemplary embodiment of the device 1 according to the invention, with FIG. 1 showing a frame structure 7 of the housing 3 without components and FIG. 2 showing the frame structure 7 of the housing 3 including components. The housing 3 delimits a space 6 above a lawn area 4. The frame structure 7 has struts along the edges of the parallelepiped housing 3. The two end walls which oppose each other in the longitudinal direction of the housing form a front wall 8 and a rear wall 9. Front wall 8 and rear wall 9 define a rectangular frame 10 made up two vertically and two horizontally arranged struts 11, 12 in each case, which are part of the frame structure 7 of the housing 3.

The respective opposite upper and lower corners 13, 14 of the rectangular frames of the front and rear walls are connected with each other in the longitudinal direction through longitudinal struts 15. The longitudinal struts 15 and the vertical struts delimit side walls 22.

In addition to the front and rear walls 8, 9, the housing 3 and its frame structure 7 is provided with a roof 21 and the side walls 22.

The roof 21 is designed as a pitched roof. Arranged at the roof ridge of the roof is a longitudinal strut 15 which extends in the longitudinal direction and is connected with the upper corners 13 through four gable struts 5.

The walls are preferably made up of films. The frame work 7 and the films define a tent.

The films can be transparent. This transparent film material causes a greenhouse effect in the interior of the device, similar to glass in conventional greenhouses.

The longitudinal struts 15 are designed so as to be adjustable in length. They connect the front and rear walls 8, 9 in the longitudinal direction with each other such that the distance between the front and rear walls 8, 9 can be varied between 0.5 m and 7 m, for instance.

The longitudinal struts are designed in accordion-like fashion.

It can also be provided to realize the connecting struts 15 in the form of struts which can be extended in the manner of a telescope (pneumatically).

These variable longitudinal struts 15 are each provided with a blocking member (not illustrated) to block these or to extend and retract them in the unblocked state. The blocking members are connected to a controller. In the extended and the retracted state, the connecting struts are blocked by the locking members which are actuated by the controller 20. Through this, the housing 3 constitutes a stiff or rigid unit whereby it possesses a high stableness.

The frame structure 7 and the struts 11, 12, 15 of the housing 3 are made from a light-weight and stiff material such as a glass-fiber reinforced plastic material or aluminum hollow sections, for instance.

At the lower side, the lower corners 14 of the front and rear walls 8, 9 are provided with wheels 16.

Both wheels 16 of the front wall 8 are connected with one motor 17 each to drive them. In combination with the wheels 16, the motor 17 represents a moving equipment.

Both wheels 16 of the rear wall are realized so as to be rotatable around a vertical axis by bearings 18. A brake 19 is provided on the wheels 16 in order to prevent any unwanted rolling movement of the wheels 16 of the rear wall.

The motor 17 and the brake 19 are connected to the controller 20. The driven wheels 16 can be driven with different speeds in order to be able to turn the device 1.

In this way, the device 1 is very maneuverable and can be exactly moved on smallest space.

Moreover, the device 1 is able to be collapsed if the wheels 16 of the rear wall 9 are blocked by the brake 19 and the front wall 8 is moved towards the rear wall 9 by means of the motors 17.

Sensors 23 are arranged on the lower horizontal struts 12 of the front and rear walls 8, 9 as well as on the lower connecting struts 15 in a surrounding manner or circumferentially distributed in order to be able to detect obstacles and/or markings. It is possible, for instance, to provide two sensors 23 on each side of the device 1.

A wire arranged on the lawn area 2 or light signals (laser) can be provided as a marking, for instance. This allows to delimit the area to be treated, and the controller of the device 1 is simplified.

Instead of these sensors 23 or in addition to these sensors, it is also possible to provide proximity sensors to prevent a collision of two devices 1 which are separately moved over the lawn area 2, or to prevent a collision with an obstacle.

The lower sides of the walls 8, 9, 21, 22 comprise collars 24 so as to enclose the space 6 delimited by the device 1 in a gas-tight manner with respect to the surroundings and the lawn area 2.

Further, a wind metering device 25 is arranged in the upper region of the device 1 or on the roof 21, to measure the wind speed in the proximity of the device.

The controller 20 evaluates the data detected by the wind metering device 25.

The controller 20 is realized such that the device 1 is moved over the lawn area 2 by means of the motor 17 with a predetermined speed or stays there for a certain time to ensure the optimum treatment period for every lawn area unit.

In case of storm or gusty wind, the controller 20 can collapse the device 1 to a more compact or smaller format to reduce the surface area exposed to the wind. By blocking the wheels of the rear wall and moving the front wall 8 towards the rear wall 9, the total length of the device 1 is shortened.

It can also be provided that the device 1 is transported into a shelter where it is protected against damages through the wind. The shelter is designed such that it can accommodate several of such devices 1, at least in the collapsed state.

In an upper region or underneath the roof 21, an outflow means 26 for gas is provided; this outflow means 26 is a tubular structure 27, for instance, extending across a partial length or the entire length of the space 6. The tube or the tube-like structure 27 comprises outflow openings 28 from which $CO_2$ gas can flow out.

The $CO_2$ gas comes from a gas storage container (not illustrated) which is connected with the tubular structure 27 by means of a corresponding supply line 29.

In order to monitor the $CO_2$ content in the enclosed space 6 or the tent, a $CO_2$ metering device or a $CO_2$ sensor 30 is preferably connected to the gas storage container through a line 31, the controller 20 controlling/regulating the gas content.

At a height h as measured from the ground or lawn, the housing 3 or tent is provided with an illumination device 32 which consists of fluorescent tubes, incandescent lamps or gas discharge lamps, for instance. It is preferred that photosynthesis lamps are used, such as those lamps which are produced by General Electric Comp. and sold under the trade name LUCALOX PSL™. It is also possible to provide light emitting diodes (LED) as illumination device 32, which emit light in a wavelength range which is suitable for photosynthesis.

If a lawn heating equipment 33 is provided in the ground underneath the lawn 2, a circulation of the $CO_2$ gas, flowing out of the tubular structure 27 and flowing or falling towards the bottom, will take place within the enclosed space 6, the convection inducing an upwardly directed flow of the $CO_2$ in the edge portions when introduced centrically.

It has been found that the generation of heat of the illumination device 32 is absolutely sufficient for developing such convection so that a sufficient convection is ensured even in stadiums which are not equipped with a lawn heating system.

A tube 27 is used for supplying the $CO_2$ gas in the exemplary embodiment discussed above. It has turned out, however, that it is possible in the context of the invention to use an individual, punctual nozzle instead of such a tube, since a uniform distribution of the $CO_2$ gas is ensured by the convection prevailing in the enclosed space.

The illumination device 32 is provided at a height h ranging from 1.40 m to 3 m, preferably 2.20 m to 2.50 m, the $CO_2$ supply line being provided at a height of approximately 20 cm to 80 cm above the illumination device.

The further exemplary embodiments of the device according to the invention exhibit the features of the first exemplary embodiment, unless otherwise stated.

It is also possible to do away with the outflow device 26 and to arrange the illumination device 32 at a height h of 10 cm above the lawn area 4 up to approximately 0.5 meter to 1 meter. Through this measure, the entire device 1 receives a very small height and a very small surface which is exposed to the wind.

Figure 3:
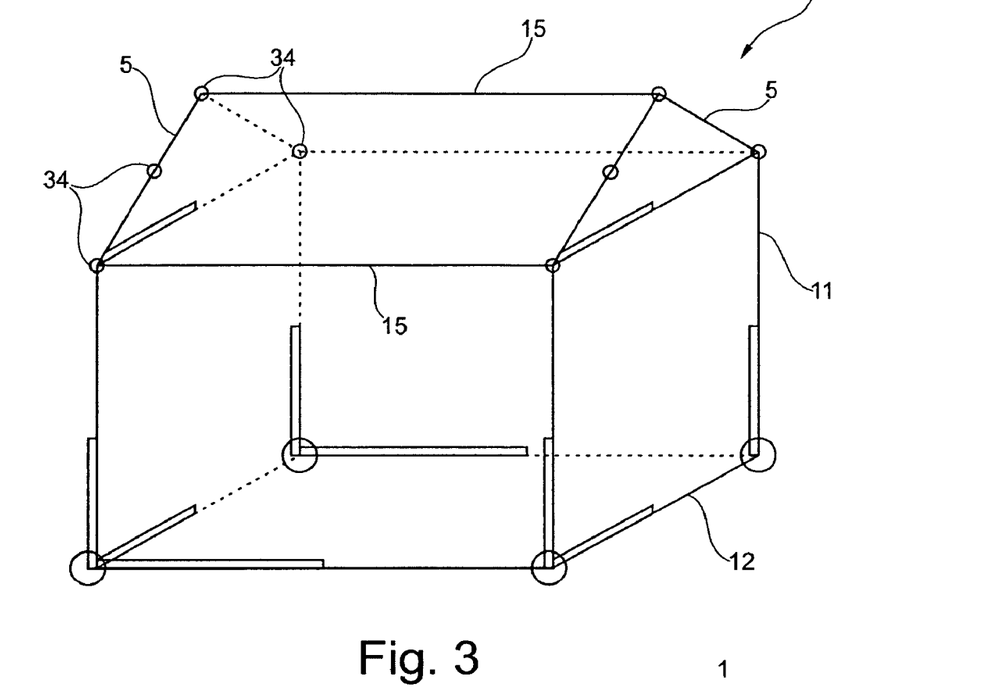
FIG. 3 shows a further exemplary embodiment of the device according to the invention in a three-dimensional view.

In a second exemplary embodiment of the device (FIG. 3), the horizontal and vertical struts of the front and rear walls are designed so as to be variable in length. In this way, the device can be collapsed not only in length but also in width and in height, in order to reduce the surface area exposed to the wind.

Figure 4:
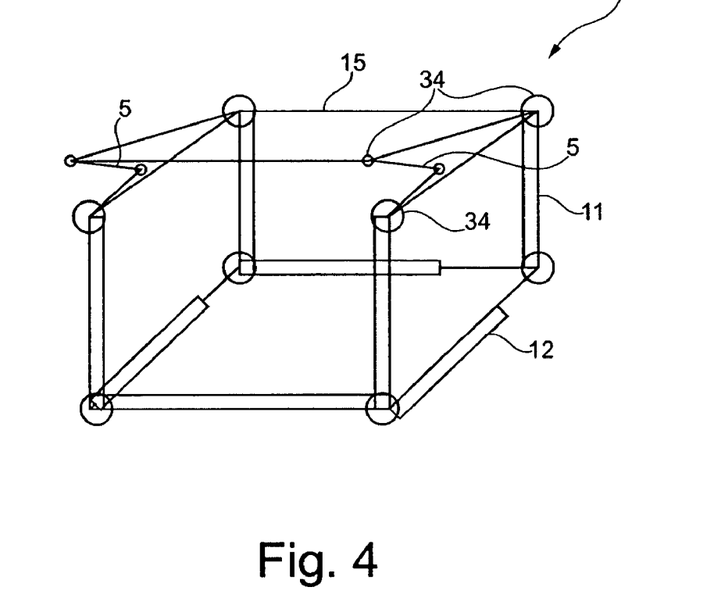
FIG. 4 shows a further exemplary embodiment of the device according to the invention in a three-dimensional view.

In such an embodiment, the roof 21 has respective joints 34 at the gable struts 5 and at the upper corners of the front and rear walls 8, 9 in order to design the roof 21 so as to be foldable (FIG. 4).

In a further exemplary embodiment, actuating motors (not illustrated) are provided for extending and retracting the horizontal and vertical struts 11, 12 and the longitudinal struts 16; these actuating motors are driven by the controller 20.

With such a design of the device, the motors 17 merely serve for steering or rotating and moving the device 1.

In a further exemplary embodiment of the device according to the invention (FIG. 5), the wheels 16 of the front wall 8 are driven by one single motor 17 which is connected with both wheels through a driving shaft 50. Moreover, the wheels of the front wall are connected with an actuating drive 51 in order to be able to steer the device.

Figure 5:
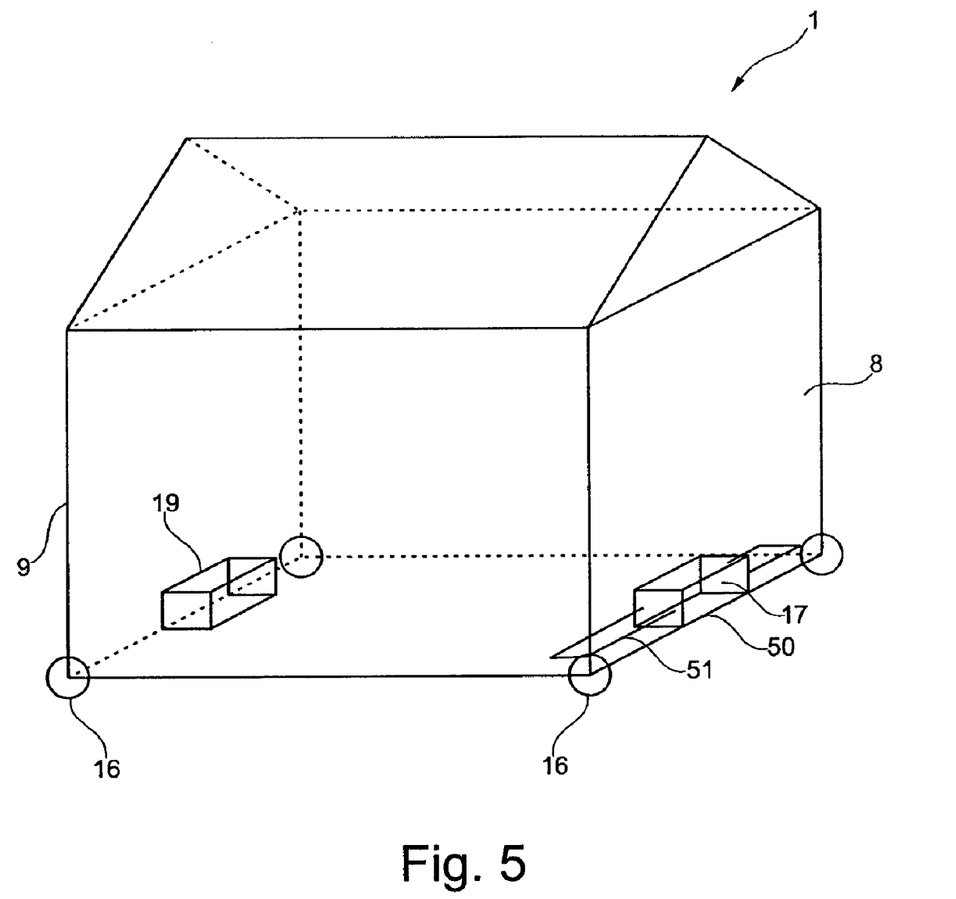
FIG. 5 shows a further exemplary embodiment of the device according to the invention in a three-dimensional view.

The wheels 16 of the rear wall are connected with a brake 19 in order to be able to block the rear wall 9.

In a further exemplary embodiment (FIG. 6), a lawn mowing and/or scarifying device 35 is arranged in the longitudinal direction in the region in front of the front wall 8.

Figure 6:
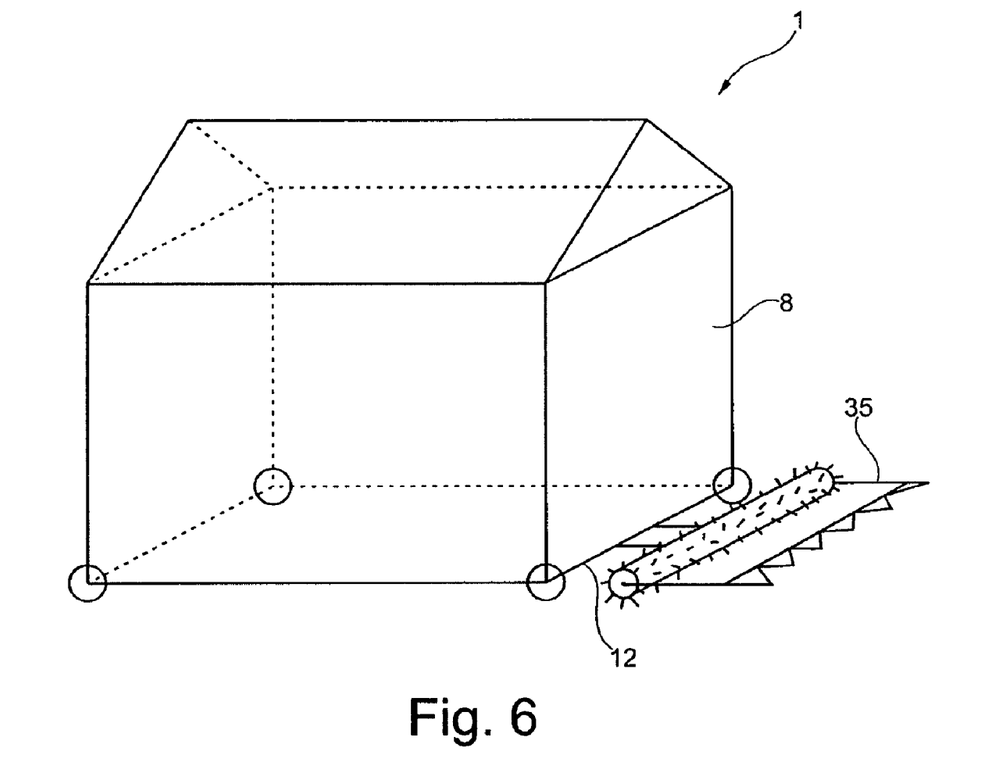
FIG. 6 shows a further exemplary embodiment of the device according to the invention in a three-dimensional view.

The lawn mowing and/or scarifying device 35 is likewise controlled by the controller 20 and works in particular during moving the device 1 in order to additionally care the lawn area 4 by cutting and/or scarifying when the device is moved.

Several of the devices 1 as described above can be coupled to form a train. Each of the devices forms one segment of the train. With such a train, a large area is covered and treated using relatively small segments. This makes it possible to treat even contoured landscapes such as golf courts, as within a train an adaptation to the variable contour occurs by the different inclinations of the individual segments. The individual segments can be pivotally connected to each other such that they delimit a common space above the lawn area.

This can be realized, for example, by dispensing with the corresponding front and rear walls. The individual segments (or their side walls and roofs) are connected with each other in gas-tight manner by means of hoses.

In a further embodiment of the device 1 according to the invention (FIG. 7), it is realized in the manner of a tent with walls that can be inflated like an air mattress. These can be inflated by a pump 36, for instance. If the wind is too strong, the walls can be deflated. In this way, the device lies flat on the ground and does not present any surface area which is exposed to the wind.

Figure 7:
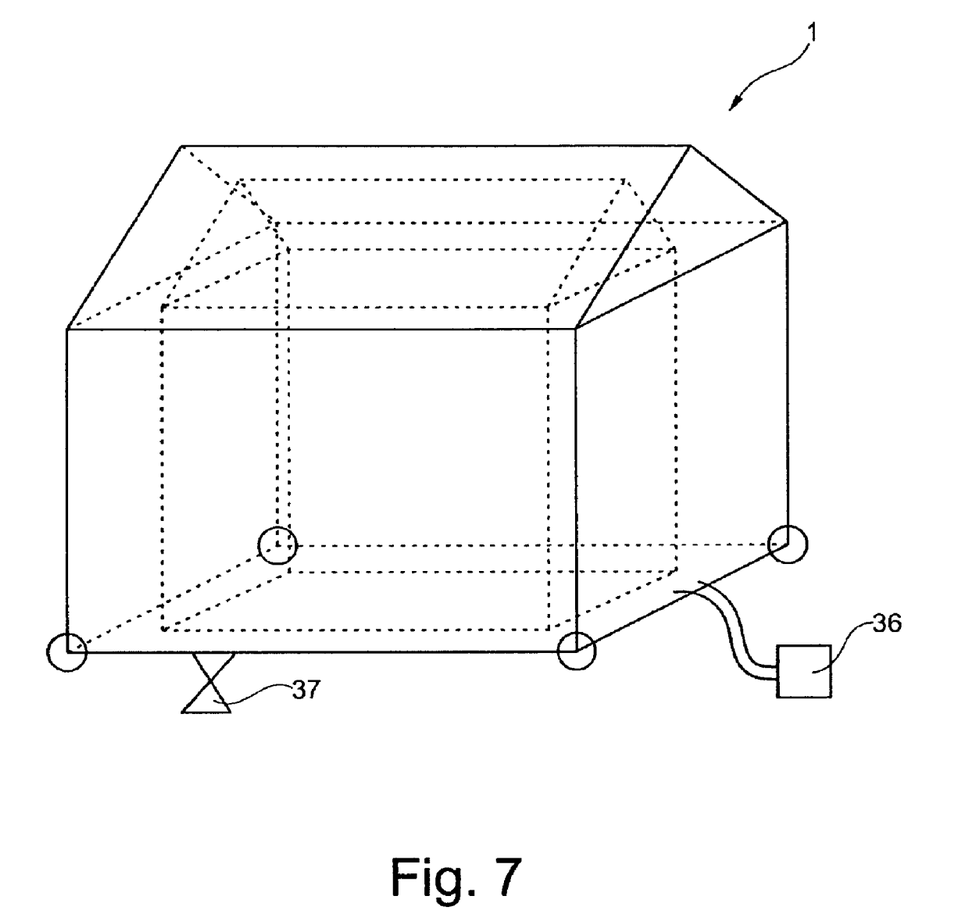
FIG. 7 shows a further exemplary embodiment of the device according to the invention in a three-dimensional view.
Figure 8:
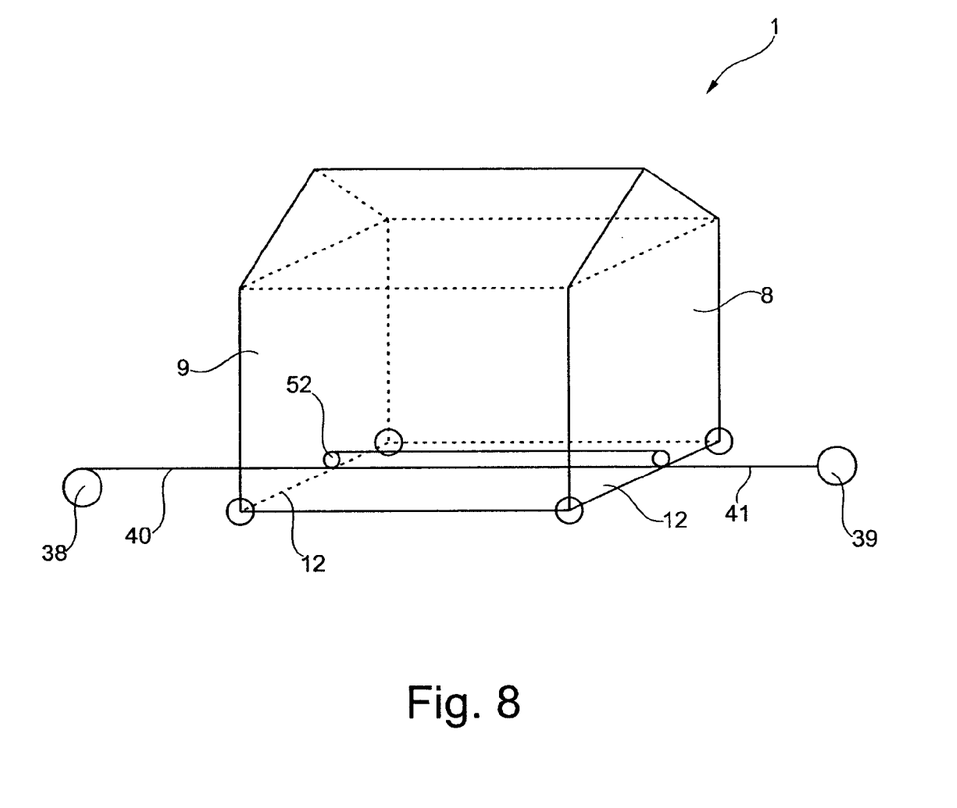
FIG. 8 shows a further exemplary embodiment of the device according to the invention in a three-dimensional view.

The individual walls may comprise individual chambers, for instance, which are connected with each other in communicating fashion to increase the stability of the device; said chambers can be inflated through a pump 36 connected to the controller 20.

Discharging the air from the walls is performed through a valve 37 which can be driven by the controller 20.

In a further embodiment of the device 1 according to the invention provision can be made that the walls of the device are formed of glass or plastics, such as for instance polymethyl methacrylate (PMMA), acrylic glass, PERSPEX® (poly[methyl methacrylate]), LIMACRYL® (poly[methyl methacrylate]), Piacryl or O-glass. If lamps are used, it is not strictly necessary that the walls are formed so as to be transparent.

The controller 20 can be connected to a satellite-based navigation system and/or a terrestrial navigation system.

In a further embodiment of the device 1 according to the invention, two winches 37, 38 are provided as moving equipment of the device 1 instead of the motors. The first winch 37 is connected with the lower transverse strut 12 of the rear wall 9 through a cable 39. The second cable 40 is arranged on the lower transverse strut 12 of the front wall 8 and is deflected through a pulley 52 which is arranged on the lower transverse strut 12 of the rear wall 9 so that it exits the device at the front end of the device 1 and is connected with the second winch 38. By actuation of the winches 38, 39, the device can be moved on a lawn area. In addition, the device can be collapsed and/or extended when the connecting struts are not blocked. The device can be transported into a shelter by the winches in order to protect it from damages through wind.

One winch only will do for moving the device 1, if said winch is arranged, for instance, on one side of the lawn area and is equipped with a loop-shaped endless cable which is deflected by a pulley at the other side of the lawn area. The cable is connected to the device 1.

The method according to the invention will be described in the following.

One or more devices according to the invention are positioned on a lawn area to be treated.

When a preset treatment time is lapsed, the controller drives the motors in such a manner that the device is automatically displaced by e.g. one device length and treats a next section of the lawn.

The coordinates according to which the device is moved, can either be provided by a control routine which detects the movement of the wheels, or by signals detected by sensors, such as e.g. a wire arranged in the lawn area or a light signal, or even by a global navigation system.

The treatment of the lawn area provides for a gassing operation with $CO_2$ and/or treatment with light.

In case of a storm or thunderstorm which is strong enough to impair the operability of the device or to damage it, the device will be collapsed to more compact dimensions.

The controller receives the instructions that it has to collapse the device, for instance through evaluating the data provided by the wind metering device. The wind metering device delivers the current wind speeds in close proximity of the device and therefore is particularly suitable to deliver parameters for a save operability of the device. Any gusty nature of the wind is also taken into consideration during the evaluation.

The information for the controller can also be provided by a weather service.

Moreover, it is also possible to drive the device in manual fashion, for instance by a remote control device and corresponding to the current weather conditions.

Collapsing the device can be performed according to the exemplary embodiments described above, for instance by blocking the wheels of the front wall through the brake and in that the driven wheels of the rear wall move the rear wall towards the front wall. The connecting struts will then be folded and the device has a smaller overall length.

In this way, the device has a smaller surface area which is exposed to the wind and can stay on the lawn area in the majority of cases.

The device can also be reduced in width and/or in height, further reducing the surface exposed to external impacts.

It is also possible that the device is automatically moved into a corresponding shelter where it is protected from a thunderstorm.

As an additional treatment step, provision can be made that the device mows and scarifies the lawn during the moving process, which is performed by a lawn mowing and/or scarifying device.

In a further exemplary embodiment, if a first and a second winch are arranged on opposite sides of a soccer field, for instance, the device can likewise be collapsed.

In this arrangement, the cable of the second winch is blocked and a pulling force is applied to the cable of the first winch. The cable of the first winch is attached to the lower transverse strut of the front wall and is deflected via the freely rotatable pulley at the lower transverse strut of the rear wall. This results in the front wall being moved towards the rear wall until the device is completely collapsed.

In a further exemplary embodiment of the present invention (FIGS. 9, 10), the device 1 comprises a housing 3 with a frame structure 7 in which several housing profile frames 48 are respectively connected with longitudinal struts 15 which can be pushed together and extended like an accordion. Each of the housing profile frames has two vertical struts 11 as well as a roof strut structure 49 extending between the two upper ends of the vertical struts. Each roof strut structure 49 has a horizontal strut 12 and two gable struts. The regions between two housing profile frames 48 define a housing section 42 in each case.

Figure 9:
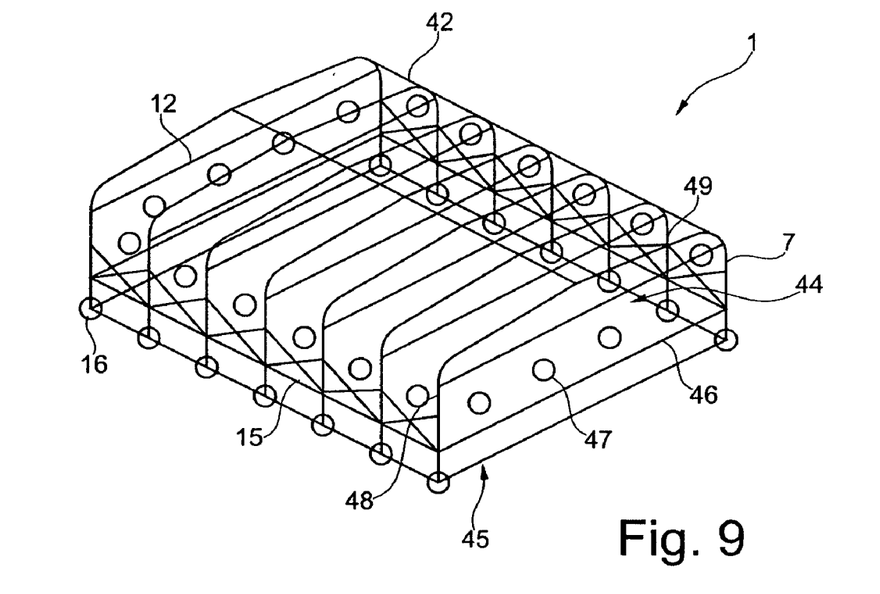
FIG. 9 shows a further exemplary embodiment of the device according to the invention in a three-dimensional view in an extended state.
Figure 10:
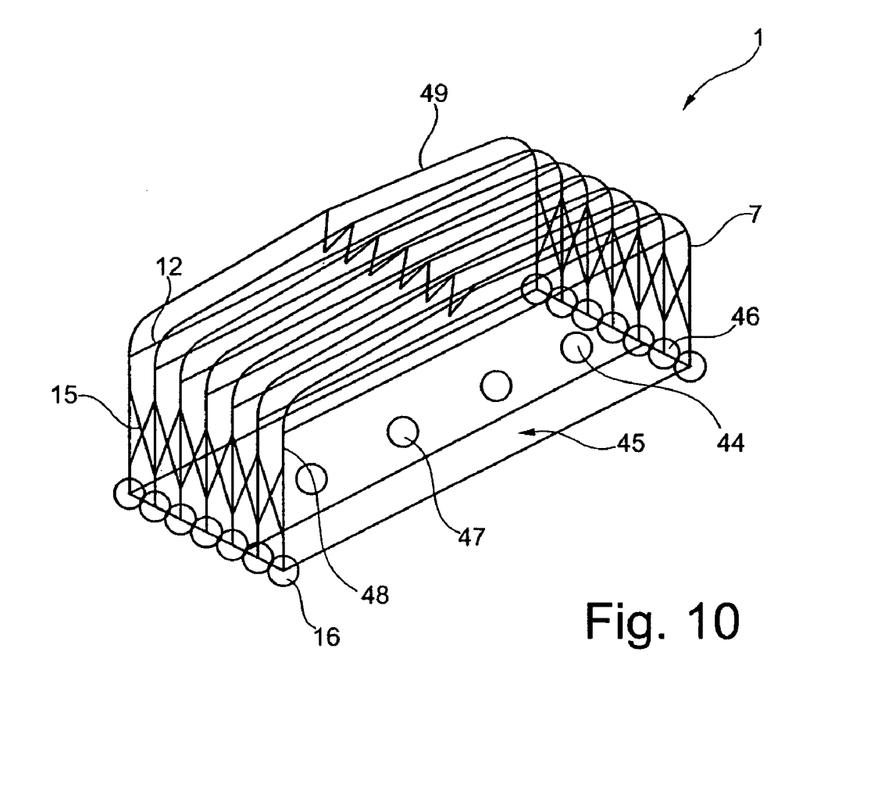
FIG. 10 shows a further exemplary embodiment of the device according to the invention in a three-dimensional view in a collapsed state.

Each of the housing sections 42 has a length of approximately 5 m and a width of approximately 6 m. Two to five of these housing sections 42 can form a tunnel covering an area of approximately 150 m². The lawn area of a stadium (approximately 7000 m²) can be regenerated in sections with, for instance, four of these tunnels.

The individual housing profile frames 48 of this tunnel are provided with wheels 16 at their lower ends so that they can be moved over the lawn 2 to be regenerated.

In the folded state, the housing sections 42 have a length of approximately 80 cm and can be displaced with a simple hoisting machine, for instance a fork lifter. It is also possible that the device comprises a motor for driving the wheels according to the exemplary embodiments described above.

Figure 11:
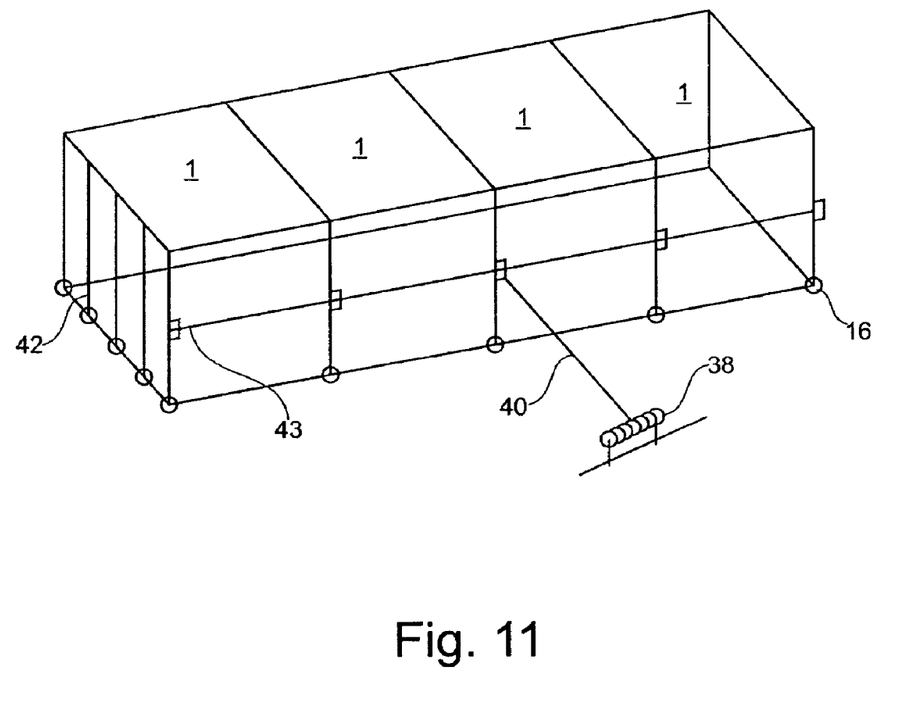
FIG. 11 shows a further exemplary embodiment of the device according to the invention in a three-dimensional view.

FIG. 11 schematically shows a plurality of neighboring devices of the exemplary embodiment shown in FIGS. 9 and 10 in the form of a cuboid 1. The devices 1 are connected with each other in order to move them as a whole. The connection can be realized by means of a beam 43, for instance. The beam 43 is connected with a winch 38 through a cable 40. The devices can be moved over the lawn area 2 by actuating this winch 38.

At a height h as measured from the lawn 2, each housing section 42 is provided with illumination devices 32 in the form of six lamps, for instance. The lamps are assimilation lamps by Philips, designed especially for the photosynthesis, with a power of e.g. 600 Watt and an illumination degree ranging from 100 to 200 µmol/m²s.

The lamps are arranged at a height h ranging from 1.6 m to 2.0 m, and preferably at 1.8 m.

The lamps increase the ambient temperature by approximately 10° C. This is enough in most cases to reach a temperature of 3° C. to 5° C. even during winter; this temperature is required so that the lawn can grow.

In the event of high outdoor temperatures, it may expedient to spatially separate the lamps from the gas-treated space, as they develop the major part of the heat energy. Excessively high temperatures would be detrimental for the growth of the lawn. This is why according to a further embodiment the device 1 according to the invention comprises an illumination space 44 in which the illumination devices 32 are arranged, and a regeneration space 45 in which the outflow means 26 is arranged. The illumination space 44 and the regeneration space 35 are separated from each other by a second ceiling wall 46 which is transparent or designed so as to be translucent. The second ceiling wall 46 closes the regeneration space 45 in gas-tight fashion and is arranged above ground at a height of e.g. approximately 50 cm.

The lamps are arranged in the illumination space 44 underneath the roof ridge. The side walls 22 are provided with venting means 47 which are realized in the form of vent openings 47, in order to dissipate the heat energy of the lamps.

If the entire film is designed as a transparent film, sun light reaches the lawn so that the illumination devices 32 can be switched off during daylight, whereby a substantial amount of energy is saved. The film is preferably designed such that it is permeable to light from outside and reflects light on the inside, for instance by mirroring the inner surface and realizing the outer surface with a matt finish.

The special separation and/or the opened vent openings 47 prevent an additional heating of the regeneration space 45.

The embodiment shown in FIGS. 9, 10 and 11 can also be realized without any subdivision of the enclosed space 6 into an illumination space 44 and a regeneration space 44.

It is preferred that the $CO_2$ concentration lies between 800 ppm $CO_2$ and 2000 ppm $CO_2$.

By the measure of the gas-tight encapsulation by means of an enclosed space or tent, the heat generation of the lighting means and, if present, the heat generation due to a lawn heating equipment, induce a significant temperature increase which is sufficient to allow the lawn-building grass plants to grow.

A uniform concentration by means of a convective distribution is achieved by the heat generation of the lighting means, on the one hand, and (if present) by a lawn heating equipment, on the other hand.

The method and the device achieve optimum conditions for the lawn even in cold winter months and with high stressing of the lawn area; this is achieved by simple means through a higher light intensity as with daylight and a high $CO_2$ concentration with sufficiently high temperatures.

Even in the winter months, the inventors could observe a growth of approximately 0.5 mm per hour of the lawn-building grass plants. The outdoor temperatures were in the range from approximately 5° C. to 6° C. The temperatures as measured in the lawn were distinctly higher. On the one hand, this was due to the fact that a ground heating system was used. The heat input by the lamps and the heat-retaining effect by the tent as well as the $CO_2$ concentration have contributed to the temperature increase in the lawn, too. In this way, a temperature of 21° C. was achieved in the lawn.

The tents according to the invention or the enclosed spaces have a floor space of approximately 10×30 m to 15×30 m, or a floor space ranging from 30 m² to 400 m². Smaller tents are used in order to care areas which are subject to very high stressing, such as the area around the goal, for instance.

It is provided for that the system or the device and the method are set up and operated at a certain place for four to twelve hours, and is then displaced in order to continue its operation at another place.

The method according to the invention and the device according to the invention offer the advantage that they allow a very simple, effective and low-cost treatment of large lawn areas.

The invention claimed is:

1. A device for growth acceleration and regeneration of lawn areas, comprising:
    a housing defining an enclosed space which is open towards the bottom and can be placed on a lawn area and delimits a space above the lawn area, the housing comprising
    a frame formed of a plurality of struts arranged to form a first end wall, a second end wall, a first side wall, a second side wall and a roof;
    wherein said first and second end walls are each formed of two vertically and two horizontally extending struts, said first and second end walls longitudinally spaced from each other by said first and second sidewalls;
    wherein said first and second sidewalls are each formed of a plurality of longitudinally extending struts, each of said longitudinally extending struts connected to said first and second end wall, wherein said longitudinal struts are adjustable in length such that the distance between the first and second end walls may be varied, and each said longitudinal struts provided with blocking members to selectively lock said longitudinally extending struts;
    a film material covering said frame to define a tent, said film being formed so as to be transparent and gas-tight;
    an illumination device positioned within said housing for illuminating the lawn area,
    a CO2 outflow means being provided for introducing CO2 into the housing,
    wherein said housing is realized with moving equipment said moving equipment comprises
    a first pair of wheels coupled to said first end wall of the housing and a second pair of wheels coupled to said second end wall of the housing,
    a motor for driving one or more of said first pair of wheels, said first pair of wheels rotatable around a vertical axis by bearings,
    a brake connected to one or more of said second pair of wheels, said second pair of rotatable around a vertical axis by bearings,
    a controller operatively connected with said blocking member, said motor and said brake;
        said controller operable to automatically move said housing between an extended state and a collapsed state by releasing said blocking members, actuating said brake coupled to said second pair of wheels and actuating said motor coupled to said first pair of wheels, thereby preventing movement of the second wall of the housing while the length of the longitudinal struts are reduced and the first end wall moves toward the second end wall
        said controller operable to automatically move the entire housing in said extended state by locking said blocking members, releasing said brake coupled to said second pair of wheels and actuating said motor coupled to said first pair of wheels thereby automatically and freely moving said housing over an entire portion of the lawn area for growth acceleration and regeneration of the entire portion of the lawn area in sections.

2. The device according to claim 1, wherein the moving equipment is realized as an electrical drive.

3. The device according to claim 1, wherein the device further comprises a wind metering device.

4. The device according to claim 1, wherein the device further comprises one or more sensors to be able to detect obstacles and/or markings.

5. The device according to claim 1, wherein the device further comprises a satellite-based navigation system to provide data for the controller.

6. The device according to claim 1, further comprising collars pointing downwards arranged on a lower edge of the housing.

7. The device according to claim 1, wherein a plurality of the devices are coupled to form a train.

8. The device according to claim 1, wherein the device comprises a lawn mower and/or a scarifier.

9. The device according to claim 1, wherein the illumination device is arranged at a height of 0.1 m to 3 m above the lawn area.

10. The device according to claim 1, wherein the $CO_2$ outflow means is arranged above the illumination device.

11. The device according to claim 1, wherein the $CO_2$ outflow means is arranged in the highest region or at the highest point of the housing.

12. The device according to claim 1, wherein the tent wall comprises a textile, in particular tear-proof, layer.

13. The device according to claim 1, wherein several of the devices neighboring each other are connected with one another.

14. The device according to claim 1, wherein the outflow means is a tubular structure extending over a partial length or the entire length of the space, the tube or the tube-like structure comprising outflow openings from which a $CO_2$ gas can flow out.

15. The device according to claim 1, wherein a gas storage container for storing $CO_2$ gas is additionally provided, which is connected to a tube-like structure by means of a corresponding supply line, a $CO_2$ metering device or a $CO_2$ sensor being provided in the enclosed space of the housing for monitoring the $CO_2$ content, said sensor being connected via a line with the gas storage container or a separate means for controlling/regulating the gas content, and the device for controlling/regulating the gas content being realized so as to take $CO_2$ gas from the gas storage container in regulating manner.

16. The device according to claim 1, wherein the illumination device consists of incandescent lamps and/or gas discharge lamps and/or metal vapor lamps and/or fluorescent tubes.

17. The device according to claim 1, wherein the enclosed or closed space has a floor space ranging from 5 m×6 m to 20 m×40 m.

18. The device according to claim 1, wherein the enclosed or closed space has a floor space ranging from 30 $m^2$ to 400 $m^2$.

19. A method for growth acceleration and regeneration of lawn areas comprising:

the lawn area being at least partially delimited on its upper side by a housing of a device defining an enclosed space which is open towards the bottom, the housing comprising
a frame formed of a plurality of struts arranged to form a first end wall, a second end wall, a first side wall, a second side wall and a roof;
wherein said first and second end walls are each formed of two vertically and two horizontally extending struts, said first and second end walls longitudinally spaced from each other by said first and second sidewalls;
wherein said first and second sidewalls are each formed of a plurality of longitudinally extending struts, each of said longitudinally extending struts connected to said first and second end wall, wherein said longitudinal struts are adjustable in length such that the distance between the first and second end walls may be varied, and each said longitudinal struts provided with blocking members to selectively lock said longitudinally extending struts;
a film material covering said frame to define a tent, said film being formed so as to be transparent and gas-tight;
an illumination device positioned within said housing for illuminating the lawn area,
a CO2 outflow means being provided for introducing CO2 into the housing,
wherein said housing is realized with moving equipment
said moving equipment comprises
a first pair of wheels coupled to said first end wall of the housing and a second pair of wheels coupled to said second end wall of the housing,
a motor for driving one or more of said first pair of wheels, said first pair of wheels rotatable around a vertical axis by bearings,
a brake connected to one or more of said second pair of wheels, said second pair of rotatable around a vertical axis by bearings,
a controller operatively connected with said blocking member, said motor and said brake;
wherein the method for using the device includes:
said controller operable to automatically move said housing between an extended state and a collapsed state by releasing said blocking members, actuating said brake coupled to said second pair of wheels and actuating said motor coupled to said first pair of wheels, thereby preventing movement of the second wall of the housing while the length of the longitudinal struts are reduced and the first end wall moves toward the second end wall
said controller operable to automatically move the entire housing in said extended state by locking said blocking members, releasing said brake coupled to said second pair of wheels and actuating said motor coupled to said first pair of wheels thereby automatically and freely moving said housing over an entire portion of the lawn area for growth acceleration and regeneration of the entire portion of the lawn area in sections;
wherein the device further comprising a brake coupled to the second pair of wheels in order to prevent movement of the second pair of wheels during the collapsing of the device and the first pair of wheels move the first wall of the housing towards the second wall of the housing.

20. The method according to claim 19,
wherein $CO_2$ is introduced in the highest region of the housing.

21. The method according to claim 19,
wherein the $CO_2$ is distributed in the housing by convection through the waste heat of the illumination device or a lawn heating equipment.

22. The method according to claim 19,
wherein the gas content in the housing is set to 500 to 1500 ppm $CO_2$.

23. The method according to claim 19,
wherein the gas concentration is measured and the gas supply is regulated.

24. The method according to claim 19,
wherein the size of the housing is selected such that a temperature of at least 6° C. arises within the housing with a dwell time of four to twelve hours.

25. The method according to claim 19,
wherein the air present in the enclosed space is additionally heated with heating means.

* * * * *